US010210299B1

(12) United States Patent
Ginetti

(10) Patent No.: US 10,210,299 B1
(45) Date of Patent: Feb. 19, 2019

(54) METHODS, SYSTEMS, AND COMPUTER PROGRAM PRODUCT FOR DYNAMICALLY ABSTRACTING VIRTUAL HIERARCHIES FOR AN ELECTRONIC DESIGN

(71) Applicant: Cadence Design Systems, Inc., San Jose, CA (US)

(72) Inventor: Arnold Ginetti, Antibes (FR)

(73) Assignee: Cadence Design Systems, Inc., San Jose, CA (US)

(*) Notice: Subject to any disclaimer, the term of this patent is extended or adjusted under 35 U.S.C. 154(b) by 154 days.

(21) Appl. No.: 15/283,042

(22) Filed: Sep. 30, 2016

(51) Int. Cl.
*G06F 17/50* (2006.01)

(52) U.S. Cl.
CPC ...... *G06F 17/5072* (2013.01); *G06F 17/5081* (2013.01)

(58) Field of Classification Search
CPC .................. G06F 17/5072; G06F 17/5081
USPC ........... 716/118, 139, 124, 125, 131; 703/14
See application file for complete search history.

(56) References Cited

U.S. PATENT DOCUMENTS

| | | | |
|---|---|---|---|
| 5,008,882 A | | 4/1991 | Peterson |
| 5,568,396 A | | 10/1996 | Bamji |
| 5,581,474 A | | 12/1996 | Bamji |
| 5,604,680 A | | 2/1997 | Bamji |
| 6,256,768 B1 | * | 7/2001 | Igusa ................. G06F 17/5068 716/124 |
| 6,289,412 B1 | | 9/2001 | Yuan |
| 6,507,932 B1 | | 1/2003 | Landry |
| 6,507,941 B1 | | 1/2003 | Leung |
| 6,516,456 B1 | * | 2/2003 | Garnett ............... G06F 17/5022 716/119 |
| 6,738,957 B2 | | 5/2004 | Gont |
| 7,062,475 B1 | * | 6/2006 | Szabo ............... G06F 17/30867 706/11 |
| 7,065,729 B1 | | 6/2006 | Chapman |
| 7,117,468 B1 | | 10/2006 | Teig |
| 7,117,473 B1 | | 10/2006 | Knol |
| 7,120,892 B1 | | 10/2006 | Knol |
| 7,310,793 B1 | | 12/2007 | Teig |
| 7,418,686 B1 | | 8/2008 | Knol |
| 7,469,255 B2 | | 12/2008 | Kusterer |
| 7,478,352 B2 | | 1/2009 | Chaplin |

(Continued)

OTHER PUBLICATIONS

NA9109385, "Design Extensions to Contents View", IBM Technical Disclosure Bulletin, Sep. 1991, vol. 34, No. 4A, pp. 385-388 (4 pages).*

(Continued)

*Primary Examiner* — Phallaka Kik
(74) *Attorney, Agent, or Firm* — Vista IP Law Group, LLP

(57) ABSTRACT

Disclosed are methods, systems, and articles of manufacture for dynamically abstracting virtual hierarchies for an electronic design. These techniques identify at least a portion of a layout of an electronic design and a virtual hierarchy in the layout portion according to a value for a display stop level. A plurality of figure groups at one or more virtual hierarchies in the layout portion may also be identified in the layout portion. These techniques select a plurality of layout circuit component designs according to the virtual hierarchy. The layout portion may then be abstracted into an abstracted layout portion at least by displaying the plurality of layout circuit component designs and suppressing one or more remaining layout circuit component designs.

20 Claims, 12 Drawing Sheets

(56) References Cited

U.S. PATENT DOCUMENTS

| | | | |
|---|---|---|---|
| 7,555,739 B1 | 6/2009 | Ginetti et al. | |
| 7,710,420 B2* | 5/2010 | Nonclercq | G06F 17/30572 |
| | | | 345/440 |
| 7,805,698 B1 | 9/2010 | Ferguson | |
| 7,810,064 B2 | 10/2010 | Ladin | |
| 7,865,857 B1 | 1/2011 | Chopra | |
| 7,921,096 B2* | 4/2011 | Allen | G06F 17/30554 |
| | | | 707/706 |
| 7,949,983 B2 | 5/2011 | Eshun | |
| 8,028,243 B1 | 9/2011 | O'Riordan | |
| 8,255,845 B2 | 8/2012 | Ginetti | |
| 8,271,920 B2 | 9/2012 | Cho et al. | |
| 8,375,348 B1 | 2/2013 | Raj | |
| 8,438,530 B2 | 5/2013 | Giffel | |
| 8,527,890 B2* | 9/2013 | Harada | G06F 17/30126 |
| | | | 707/821 |
| 8,560,998 B1 | 10/2013 | Salowe | |
| 8,595,237 B1 | 11/2013 | Chaudhary | |
| 8,640,078 B2 | 1/2014 | Majumder | |
| 8,640,079 B2 | 1/2014 | Majumder | |
| 8,671,368 B1 | 3/2014 | Salowe | |
| 8,839,174 B2 | 9/2014 | Suiter | |
| 8,930,863 B2 | 1/2015 | Nayak et al. | |
| 9,003,349 B1 | 4/2015 | Salowe | |
| 9,129,081 B2 | 9/2015 | Ginetti | |
| 9,141,746 B1 | 9/2015 | Ginetti | |
| 9,182,948 B1 | 11/2015 | O'Riordan | |
| 9,208,273 B1 | 12/2015 | Morlat | |
| 9,223,915 B1 | 12/2015 | Ginetti | |
| 9,317,650 B2 | 4/2016 | Chen | |
| 9,396,301 B1 | 7/2016 | Lee | |
| 9,652,579 B1 | 5/2017 | Arkhipov | |
| 9,659,138 B1 | 5/2017 | Powell | |
| 9,779,193 B1 | 10/2017 | Ginetti | |
| 9,842,178 B2 | 12/2017 | Ferguson | |
| 9,904,756 B1 | 2/2018 | Ruehl | |
| 10,025,801 B2* | 7/2018 | Kaufman | G06F 17/30286 |
| 2003/0101331 A1 | 5/2003 | Boylan | |
| 2004/0083210 A1* | 4/2004 | Ochiai | G06F 17/30241 |
| 2004/0088118 A1 | 5/2004 | Jensen | |
| 2004/0088487 A1 | 5/2004 | Barroso et al. | |
| 2005/0091627 A1 | 4/2005 | Satapathy | |
| 2005/0120316 A1 | 6/2005 | Suaya | |
| 2005/0138591 A1* | 6/2005 | Shirai | G06F 17/5081 |
| | | | 716/111 |
| 2006/0184540 A1* | 8/2006 | Kung | G06F 17/3089 |
| 2006/0200789 A1 | 9/2006 | Rittman | |
| 2006/0218156 A1* | 9/2006 | Schechinger | G06F 17/30864 |
| 2006/0282492 A1 | 12/2006 | Suaya | |
| 2008/0172638 A1 | 7/2008 | Gray et al. | |
| 2009/0005926 A1 | 1/2009 | Kaubisch | |
| 2009/0199143 A1* | 8/2009 | Schlotman | G06F 17/5031 |
| | | | 716/113 |
| 2010/0306729 A1 | 12/2010 | Ginetti | |
| 2011/0016423 A1 | 1/2011 | Brubaker | |
| 2011/0093829 A1 | 4/2011 | Orita | |
| 2011/0107281 A1 | 5/2011 | Sun | |
| 2011/0191303 A1* | 8/2011 | Kaufman | G06F 17/30286 |
| | | | 707/684 |
| 2012/0054699 A1 | 3/2012 | Cho et al. | |
| 2013/0187941 A1* | 7/2013 | Noon | G06F 17/30958 |
| | | | 345/589 |
| 2013/0290834 A1 | 10/2013 | Ginetti | |
| 2014/0177940 A1* | 6/2014 | Nakagaki | H01L 22/12 |
| | | | 382/149 |
| 2014/0264738 A1 | 9/2014 | Barry | |
| 2014/0325460 A1 | 10/2014 | Ferguson | |
| 2015/0012895 A1 | 1/2015 | Chen | |
| 2015/0067632 A1 | 3/2015 | Chen | |
| 2015/0269297 A1* | 9/2015 | Tuan | G06F 17/5036 |
| | | | 716/106 |
| 2015/0339430 A1 | 11/2015 | Nifong et al. | |
| 2015/0363478 A1* | 12/2015 | Haynes | G06F 17/30572 |
| | | | 707/625 |
| 2017/0124235 A1 | 5/2017 | Ferguson | |
| 2017/0235848 A1* | 8/2017 | Van Dusen | G06F 17/30979 |
| | | | 705/12 |
| 2017/0249416 A1 | 8/2017 | Sendig | |

OTHER PUBLICATIONS

Non-Final Office Action dated Dec. 11, 2017 for U.S. Appl. No. 15/283,089.
Notice of Allowance dated Apr. 16, 2018 for U.S. Appl. No. 15/283,089.
Non-Final Office Action dated Nov. 27, 2017 for U.S. Appl. No. 15/282,778.
Non-Final Office Action dated Nov. 30, 2017 for U.S. Appl. No. 15/199,903.
Non-Final Office Action dated Mar. 26, 2018 for U.S. Appl. No. 15/283,081.
Notice of Allowance dated May 1, 2018 for U.S. Appl. No. 15/282,778.
Notice of Allowance dated Apr. 23, 2018 for U.S. Appl. No. 15/282,739.
Final Office Action dated May 30, 2018 for U.S. Appl. No. 15/199,903.
Non-Final Office Action dated Sep. 10, 2018 for U.S. Appl. No. 15/283,052.
Notice of Allowance dated Sep. 11, 2018 for U.S. Appl. No. 15/283,081.

\* cited by examiner

404A

METHODS, SYSTEMS, AND COMPUTER PROGRAM PRODUCT FOR DYNAMICALLY ABSTRACTING VIRTUAL HIERARCHIES FOR AN ELECTRONIC DESIGN

CROSS REFERENCE TO RELATED U.S. PATENT APPLICATIONS

This Application is related to U.S. patent application Ser. No. 15/199,903 entitled "METHODS, SYSTEMS, AND COMPUTER PROGRAM PRODUCT FOR IMPLEMENTING AN ELECTRONIC DESIGN BY MANIPULATING A HIERARCHICAL STRUCTURE OF THE ELECTRONIC DESIGN" and filed on Jun. 30, 2016, U.S. patent application Ser. No. 15/282,739 entitled "METHODS, SYSTEMS, AND COMPUTER PROGRAM PRODUCT FOR IMPLEMENTING ENGINEERING CHANGE ORDERS WITH FIGURE GROUPS AND VIRTUAL HIERARCHIES", U.S. patent application Ser. No. 15/282,778 entitled "METHODS, SYSTEMS, AND COMPUTER PROGRAM PRODUCT FOR IMPLEMENTING SYNCHRONOUS CLONES FOR AN ELECTRONIC DESIGN", U.S. patent application Ser. No. 15/283,052 entitled "METHODS, SYSTEMS, AND COMPUTER PROGRAM PRODUCT FOR IMPLEMENTING LEGAL ROUTING TRACKS ACROSS VIRTUAL HIERARCHIES AND LEGAL PLACEMENT PATTERNS", U.S. patent application Ser. No. 15/283,089 entitled "METHODS, SYSTEMS, AND COMPUTER PROGRAM PRODUCT FOR IMPLEMENTING A FLOORPLAN WITH VIRTUAL HIERARCHIES AND FIGURE GROUPS FOR AN ELECTRONIC DESIGN", and U.S. patent application Ser. No. 15/283,081 entitled "METHODS, SYSTEMS, AND COMPUTER PROGRAM PRODUCT FOR IMPLEMENTING DYNAMIC MANUVERS WITHIN VIRTUAL HIERARCHIES OF AN ELECTRONIC DESIGN". The contents of the aforementioned U.S. patent applications are hereby expressly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic design processes often generate a schematic design and then proceeds through various phases from the schematic design to create a physical layout. For example, electronic design processes may start with design planning or floorplanning to generate a floorplan and proceed through at least the placement and routing process to generate a fully routed physical layout. The goals of design planning or floorplanning may include, for example, silicon utilization, increase of design performance, etc.

Furthermore, a physical layout may be constructed as a flat layout where every circuit component design in placed in a single hierarchy despite the fact that certain circuit component designs may functionally belong to a sub-module which may in turn belongs to a module that further reports to a cell in an IC (integrated circuit) design. Such a flat layout has its own advantages. For example, a flat layout may be easier for placement and routing although dealing with millions or billions of design components during the design planning or floorplanning stage is impractical at best, if not entire impossible. Flat layouts have their own disadvantages. For example, connectivity search processes are slow for flat layouts, especially when the design size or complexity increases.

Rather than a flat layout, some approaches generate a hierarchical layout with either a bottom-up or a top-down approach. A top-down approach begins the implementation process at the top or highest hierarchy and proceeds to lower hierarchies until it reaches the lowest hierarchy to complete an IC design. With the top-down approach, the functional cells at a higher hierarchy may be brought into the layout canvas while each cell include its own pins, ports, or terminals (collectively pin for singular or pins for plural hereinafter). The details of these functional cells at lower hierarchies are not yet exposed and will be designed at respective lower hierarchies as the top-down approach migrates to lower hierarchies. As a result of the non-exposure or unavailability of lower hierarchies (e.g., the lower hierarchies have not yet been implemented), a circuit designer working on the higher hierarchy may need to estimate the size of each cell and guess or guesstimate the locations of pins or terminals for the cell. The estimated cell may be too big to waste invaluable space on silicon or may be too small to accommodate all the devices therein.

In addition to the manual efforts to create the location, identification, etc. for a pin of a cell, these guesstimated pin or terminal locations unlikely to be optimal for connecting with the pins or ports of the devices within the cell. Either way, multiple iterations may be required for even a single cell. In addition, even if the circuit designer knows how these pins are connected to each other, the circuit designer may only align or offset these pins by manipulating the cell. In the event that a designer groups a set of components or cells and intends to create a logical cell for the set, the pins of the logical cell or their identifications thereof (e.g., names of the pins) have to be manually created. The designer will then have to find the corresponding pin identifications in the schematic design and associated these manually created identifications with the corresponding pin identifications.

Bottom-up approaches begin with the design of discrete circuit components and proceed to higher hierarchies as the designs of lower hierarchies are complete until the design for the top or highest hierarchy is complete. In these bottom-up approaches, pins and their identifications as well as locations are determined at lower hierarchies in their respective cells. At the higher hierarchies, these pins often present a challenge to routing these pins of an actual or virtual cell because these pins are determined individually for each cell and independent of each other and may thus cause misalignment of pins or terminals at higher hierarchies where these cells are assembled and supposed to be interconnected. To rectify these problems such as pin or terminal misalignment at higher hierarchies, the design process must return to the lower hierarchies where the devices with the misaligned pins are placed, adjust the placement of the devices, and determine whether the pins or terminals are aligned at the next higher hierarchy. These conventional approaches must then proceed to the next higher hierarchy to determine whether there exist other misalignment problems. These conventional approaches may thus iterate multiple times until an acceptable or desirable solution is found. Therefore, there is a need for a better approach to manipulate the hierarchies of an electronic design to effectively and efficiently create a cell for a group of devices.

Despite these shortfalls, hierarchical layout generation may be more beneficial for design planning or floorplanning because circuit component designs may be encapsulated in different hierarchies and may thus be manipulated with ease by manipulating higher hierarchy cells or blocks. Hierarchical layouts nevertheless present their own shortcomings. For example, hierarchical layouts are difficult for placement or routing of the design. Hierarchical layouts also consume much more computational resources at least during the design planning or floorplanning stage. For example, every hierarchy in the layout needs to be saved at least in a persistent or non-persistent form and thus consumes much more disk I/O (input/output) or network I/O, especially when the layout is still at the early planning stage where circuit component designs or blocks are often moved around or modified.

Conventional design planning tools or floorplanners often operate on individual component basis and use various techniques (e.g., force-based techniques) to pull or push components on individual basis until certain criteria are met. A designer or an EDA (electronic design automation) tool has to literally select individual circuit component designs and move the individually selected circuit component designs in a layout canvas until certain criteria are met. Although some EDA tools have attempted to improve this shortcoming by allowing designers to generate a module so that the generated module may be manipulated as a block, such attempts nevertheless fall short for the same reasons—individual identification and selection of circuit component designs during at least the module generation process. In addition, such module generation processes disturb the physical hierarchy that corresponds to the schematic hierarchy when a module is generated for a group of circuit component designs. Therefore, there is a need for implementing design planning for an integrated circuit design with virtual hierarchies to address at least the aforementioned problems and to provide a more computational resource-efficient and effective approach for early physical design stages such as floorplanning, placement, etc.

With the advent of virtual hierarchies for electronic designs as listed in the U.S. patent applications listed in the Section entitled Cross Reference to Related U.S. Patent Applications, there have been no effective techniques to abstract virtual hierarchies, especially in a flat portion of a layout or a flat layout. The users are thus presented with all the layout circuit component designs although encompassed in one or more virtual hierarchies.

Therefore, there exists a need for methods, systems, and computer program products for dynamically abstracting virtual hierarchies for an electronic design.

SUMMARY

Disclosed are method(s), system(s), and article(s) of manufacture for dynamically abstracting virtual hierarchies for an electronic design in one or more embodiments. Some embodiments are directed at a method for dynamically abstracting virtual hierarchies for an electronic design.

In some embodiments, these techniques identify at least a portion of a layout of an electronic design and a virtual hierarchy in the layout portion according to a value for a display stop level. A plurality of figure groups at one or more virtual hierarchies in the layout portion may also be identified in the layout portion. These techniques select a plurality of layout circuit component designs according to the virtual hierarchy. The layout portion may then be abstracted into an abstracted layout portion at least by displaying the plurality of layout circuit component designs and suppressing one or more remaining layout circuit component designs.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various techniques are directed to dynamically abstracting virtual hierarchies for an electronic design in various embodiments. In some embodiments, the described techniques generate a flat layout or a portion thereof for an electronic design, and the flat layout or the portion thereof remains flat until it is desired or required to transform the electronic design into a hierarchical one having more than one physical hierarchy. To address the problems with presenting too many layout circuit component designs in a user interface window displaying the flat layout or the portion thereof, these techniques described herein create the layout from a schematic and automatically create virtual hierarchies corresponding to the schematic hierarchies. The virtual hierarchies and the corresponding schematic hierarchies are further bound together, and the binding information may be saved in a persistent (e.g., on disk) or non-persistent (e.g., random dynamic memory) computer readable storage device.

In some embodiments, a global display property value (e.g., a display stop level value) may be set to display the desired level details at or above a specific hierarchical level. For example, a first display stop level value may be set to display only the design details belonging to the top virtual hierarchy but not any design details belonging to lower virtual hierarchies; and a second display stop level value may be set to display only the design details of the first lower virtual hierarchy immediately below the top virtual hierarchy in some embodiments. In some of these embodiments, the second display stop level value may also be set to display the design details in the first lower virtual hierarch as well as those of the top virtual hierarchy that is located immediately above the first lower virtual hierarchy. In some embodiments, as the display stop level value changes the display of the layout, the corresponding schematic design may also change accordingly to display the schematic details belonging to the corresponding schematic level.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
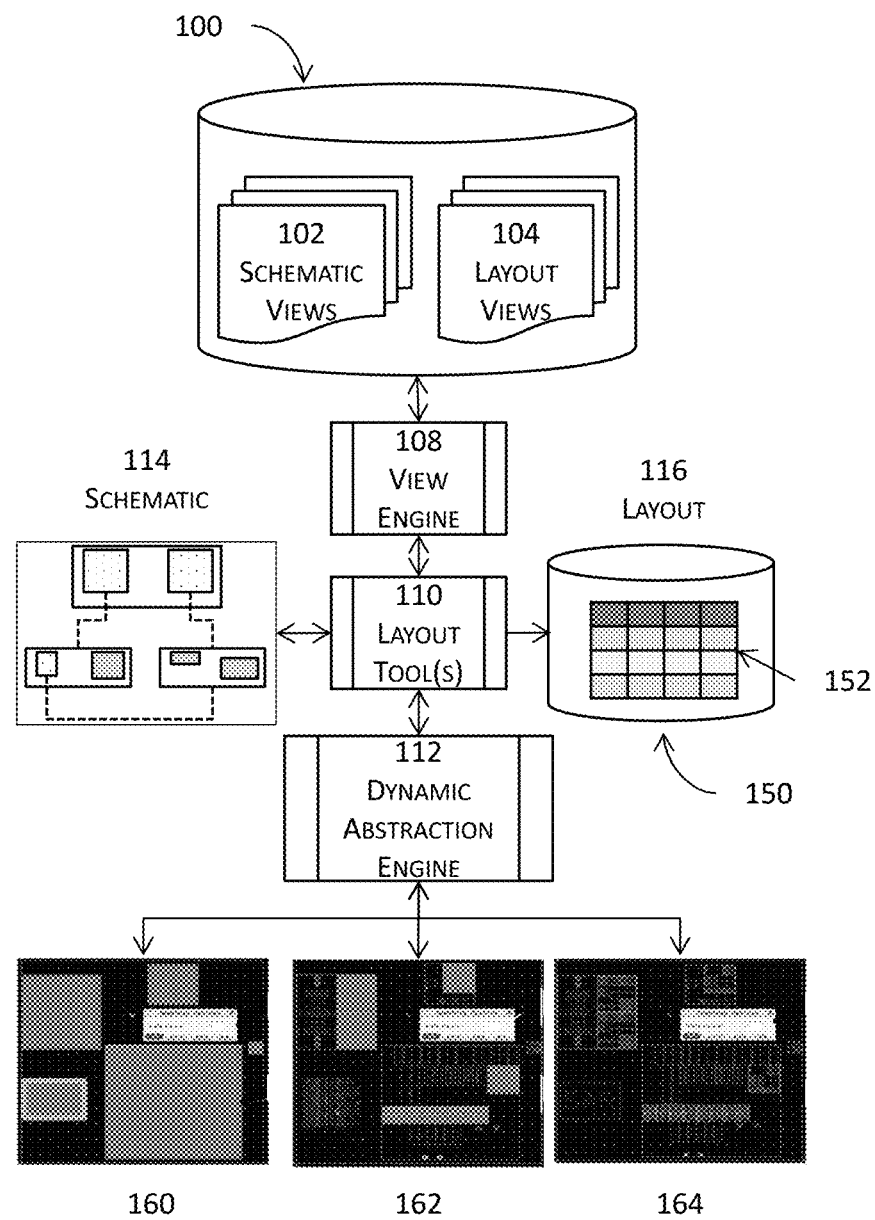
FIG. 1 illustrates high level block diagrams of simplified systems for dynamically abstracting virtual hierarchies for an electronic design in one or more embodiments.

FIG. 1 illustrates high level block diagrams of simplified systems for dynamically abstracting virtual hierarchies for an electronic design in one or more embodiments. In these embodiments, one or more layout tools 110 (e.g., a layout editor, a placement tool, a floorplanner, a routing tool, etc.) may be coupled with a dynamic abstraction engine 112 that dynamically abstracts the representation of a layout 116.

These schematic views or layout views may be generated during one or more prior sessions (e.g., a schematic editing session, a layout editing session, etc.) for the same electronic design (e.g., the schematic design 114 and the layout 116) and subsequently stored for subsequent reuse so that the same views may be cached or retrieved without regeneration that requires additional resource consumption. These schematic views 102 or the layout views 104 may be generated in response to a database command such as a database query that is executed by the layout tools including the database engine to select circuit component designs (e.g., schematic devices, layout devices, etc.) for display in the user interface.

In operation, the one or more layout tools 110 may reference a schematic design 114 of an electronic design (e.g., an IC design), identify schematic master cells or instances thereof from the schematic design 114, and invoke the display stop configuration engine 112 to determine the appropriate level of design details to display in a user interface. The one or more layout tools 110 may also implement the layout 116 by populating shapes into the layout 116 according to the corresponding schematic circuit component designs. When the display stop configuration engine 112 receives a display stop level value, the display stop configuration engine 112 functions in tandem with, for example, the one or more layout tools 110 and/or the schematic tools (not show) to identify the appropriate virtual hierarchy according to the display stop level value and to identify circuit component designs according to the identified virtual hierarchy for display and access in a user interface.

In the examples illustrated in FIG. 1, the layout 116 includes three virtual hierarchies. When the display stop level value is set to a value of "0", only the layout details belonging to the top virtual hierarchy are displayed as shown in the abstracted view 160. When the display stop level value is set to a value of "1", only the layout details belonging the first lower virtual hierarchy immediately below the top virtual hierarchy as well as the layout details belonging to the top virtual hierarchy are displayed as shown in the abstracted view 162. When the display stop level value is set to a value of "2", only the layout details belonging the second lower virtual hierarchy immediately below the first lower virtual hierarchy as well as the layout details belonging to both the top virtual hierarchy and the first lower virtual hierarchy are displayed as shown in the abstracted view 164.

In some embodiments, the layout 116 corresponds to a layout database 152 stored in a persistent or non-persistent non-transitory computer readable storage medium 150. The structure of the layout database 152 follows the physical structure of the layout 116. In other words, a flat layout corresponds to a flat layout database, both having only a single physical hierarchy. A hierarchy layout corresponds to a hierarchical database, both having a plurality of physical hierarchies. It shall be noted that both a flat layout and a hierarchical layout may have more than one virtual hierarchy despite the numbers of physical hierarchies in these two types of layouts. These one or more layout tools 110 may be further coupled to one or more view engine 108 that accesses a set of schematic views 102 or a set of layout views 104 stored in a persistent or transient non-transitory computer readable storage medium 100.

Figure 2:
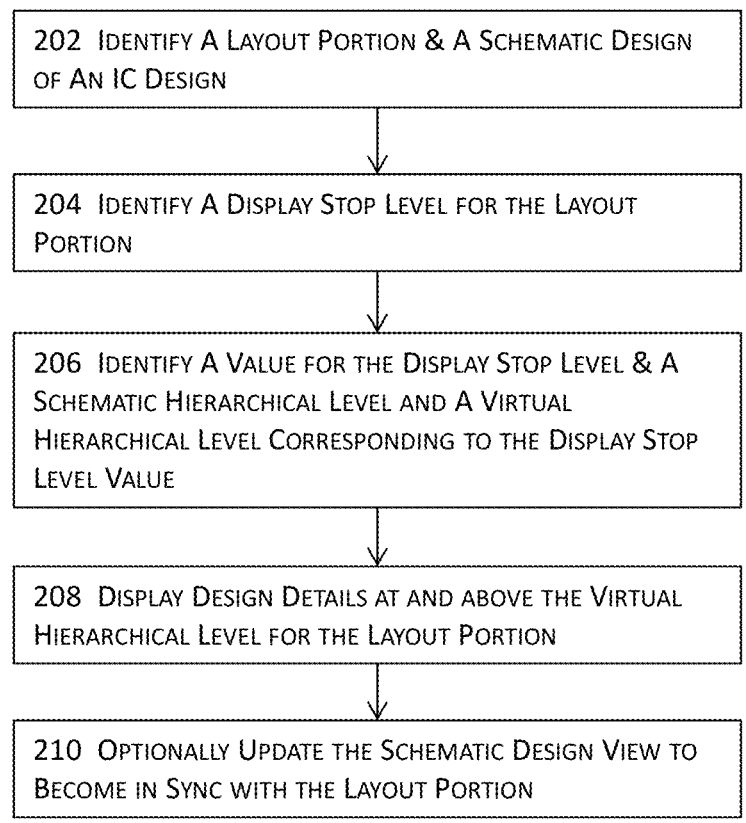
FIG. 2 illustrates a high level block diagram for dynamically abstracting virtual hierarchies for an electronic design in one or more embodiments.

FIG. 2 illustrates a high level block diagram for dynamically abstracting virtual hierarchies for an electronic design in one or more embodiments. In these embodiments illustrated in FIG. 2, a layout or a portion thereof may be identified at 202. The layout may be a flat layout having only one physical hierarchy or a hierarchical layout having multiple physical hierarchies. Nonetheless, the layout or the portion thereof includes one or more virtual hierarchies regardless of whether the layout or the portion thereof is flat or hierarchical. In some embodiments, the one or more virtual hierarchies correspond to one or more schematic hierarchies of the corresponding schematic design with a one-to-one correspondence relation.

In some of these embodiments, a schematic design correspond to the identified layout or layout portion may also be identified at 202 so that these techniques may dynamically abstract the layout while presenting the corresponding schematic design in a schematic view that corresponds to the dynamically abstracted layout. For example, when a layout is dynamically abstracted to display layout details up to the second virtual hierarchy in a layout window, these techniques provide the option to display the schematic design details up to the corresponding schematic hierarchy while abstracting schematic details at lower schematic hierarchies.

A display stop level value may be identified at 204 for the identified layout or layout portion. A value for the display stop level may be identified at 206. In addition, a virtual hierarchy and optionally a schematic hierarchy may also be identified at 206 according to the value for the display stop level. Once the virtual hierarchy is identified according to the display stop level value, design details may be displayed at and above the identified virtual hierarchy for the layout or the layout portion at 208.

A display stop level includes a configurable parameter that may receive many different types of values such as numeric values, textual values, etc. The value of the display stop level parameter may also be set interactively. For example, a designer may click anywhere on a layout circuit component design to instruct the dynamic abstraction engine (e.g., 112 in FIG. 1) to use the virtual hierarchy as the display stop level. The dynamic abstraction engine may then function in tandem with, for example, the layout tools (e.g., 110 in FIG. 1) or the schematic editor to identify the appropriate circuit component designs according to this interactively identified virtual hierarchy and to display the identified layout and schematic circuit component designs in the layout window and the schematic window, respectively.

A layout circuit component design may include the layout design of a discrete layout circuit component (e.g., a shape), a block of layout circuit components, etc. In some embodiments, a tree-like data structure comprising a plurality of virtual hierarchies in an electronic design of interest may be presented in the user interface. The plurality of virtual hierarchies may be graphically or textually emphasized in the user interface based on user interactions. For example, when a designer moves a pointing device cursor to hover the pointing device cursor over a layout circuit component design, the virtual hierarchy at which the layout circuit component design may be highlighted in the tree-like virtual hierarchical structure. Moreover, the designer may select a virtual hierarchy the tree-like virtual hierarchical structure and instruct the dynamic abstraction module to abstract the layout portion according to the selected virtual hierarchy. For example, a designer may select a virtual hierarchy from the tree-like virtual hierarchical structure, and the dynamic abstraction module may suppress design details located at or below the selected virtual hierarchy.

The display stop level may also be configured to indicate the virtual hierarchy at or below a layout will be abstracted. For example, a designer may click anywhere on a layout circuit component design to instruct the dynamic abstraction engine to abstract the layout at or below the virtual hierarchy at which the layout circuit component design is located. Depending on how the dynamic abstraction engine or the display stop level is configured, the dynamic abstraction engine (e.g., 112 in FIG. 1) may either identify the layout circuit component designs to display or identify the layout circuit component designs to represent as abstractions according to the identified virtual hierarchy via the designer's interaction. The dynamic abstraction module may then function in tandem with the layout tools to abstract the layout accordingly.

As the dynamic abstraction module abstracts and display the layout according to the display stop level value, the schematic design may also be optionally updated at 210. More specifically, the dynamic abstraction module may function in tandem with the schematic editor to identify the schematic hierarchy corresponding to the virtual hierarchy identified according to the display stop level value. The schematic circuit component designs to be displayed or the schematic circuit component designs to be abstracted in the schematic view may then be identified according to the schematic hierarchy. In addition or in the alternative, the dynamic abstraction module may function in tandem with a schematic editor to optionally update the schematic view in accordance with manipulation with one or more figure groups or with one or more virtual hierarchies.

For example, when the dynamic abstraction module, either alone or in tandem with one or more layout editors, creates a figure group or a virtual block (collectively figure group) that only logically but not physically represents a block of instances or figure groups in an electronic design, a virtual schematic hierarchy may be created in the schematic design in some embodiments where no virtual or real schematic hierarchies corresponds to the just created figure group. Similarly, in some embodiments where a virtual hierarchy is created in a layout (e.g., by creating a figure group at a virtual hierarchy corresponding to no other physical hierarchy, by virtually pushing down or pushing up the hierarchy of one or more layout circuit component design, etc.), a virtual schematic hierarchy may also be created in the schematic design in some embodiments if the newly created virtual hierarchy corresponds to no virtual or real schematic hierarchies. It shall be noted that creating virtual schematic hierarchy in a schematic design in accordance with the creation of a virtual hierarchy in the corresponding layout is entirely optional so these techniques may not create virtual schematic hierarchies in a schematic design in response to the creation of virtual hierarchies in the corresponding layout in some other embodiments.

Figure 3A:
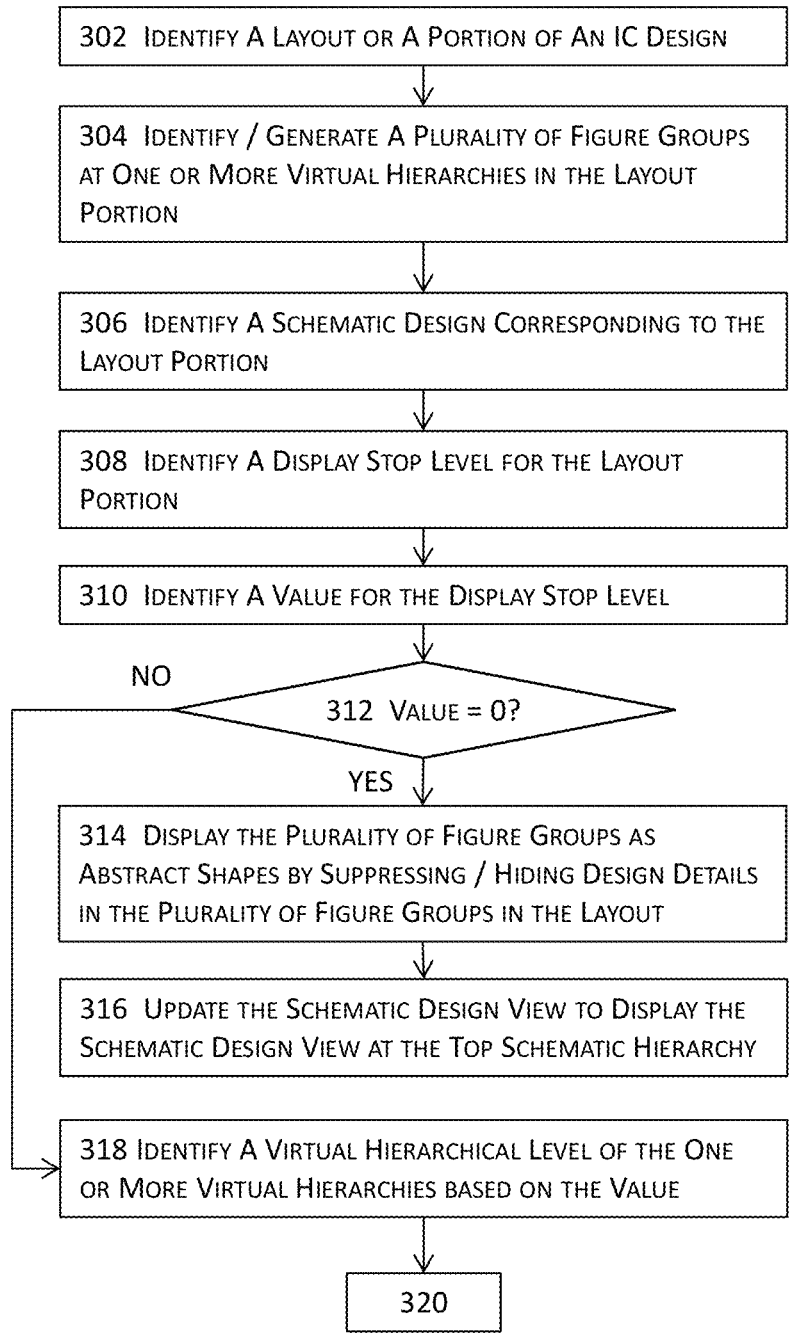
FIGS. 3A-3B jointly illustrate a more detailed block diagram for dynamically abstracting virtual hierarchies for an electronic design in one or more embodiments.
Figure 3B:
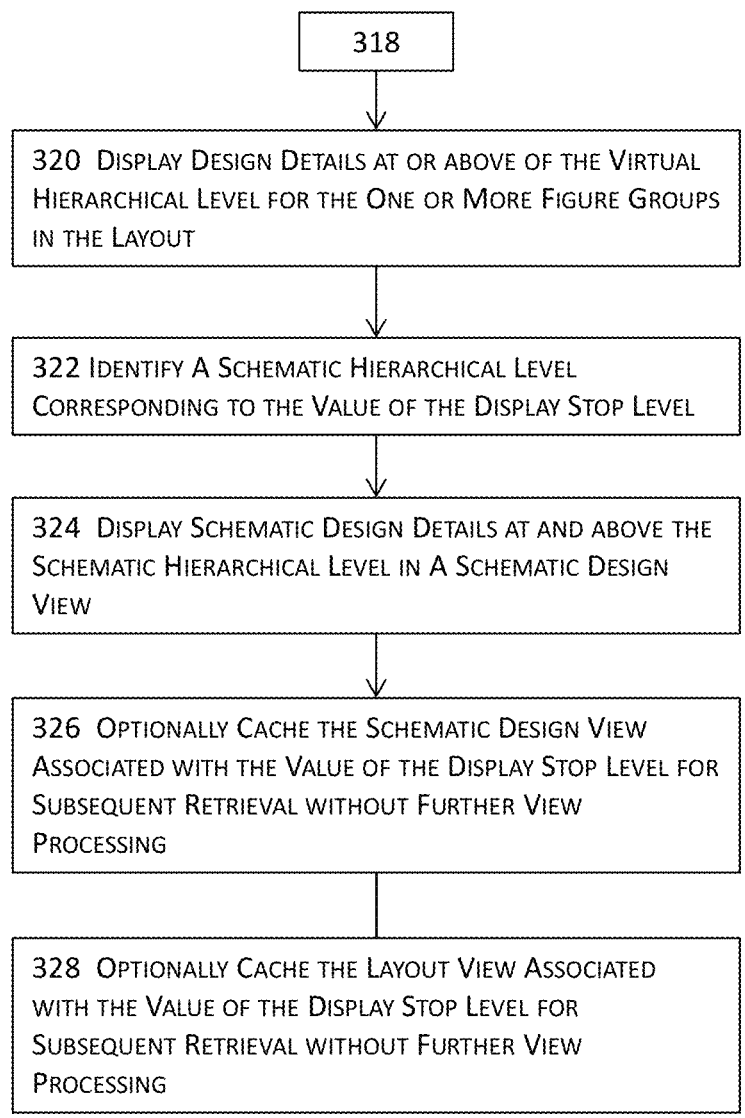

FIGS. 3A-3B jointly illustrate a more detailed block diagram for dynamically abstracting virtual hierarchies for an electronic design in one or more embodiments. In these embodiments, a flat layout or a flat portion of a layout may be identified at 302. A plurality of figure groups located at one or more virtual hierarchies may be identified, if already existing, or created, if not yet existing in the layout or the portion thereof at 304.

A figure group is created at a virtual hierarchy, rather than a physical hierarchy. In these embodiments, the virtual hierarchy does not alter the original physical hierarchical structure of the underlying electronic design. Rather, the information about the virtual hierarchy may be used to annotate the physical hierarchy (e.g., a multi-level physical hierarchical structure or a flat or single-level physical hierarchical structure) and the corresponding schematic hierarchy. In some embodiments where the layout already includes one or more virtual hierarchies, the plurality of figure groups identified or created may be assigned to the one or more virtual hierarchies, and a new virtual hierarchy may be created for a figure group that cannot be located at any of the one or more existing virtual hierarchies.

A figure group may be created by identifying a plurality of layout circuit component designs in a flat or a hierarchical layout of an IC (integrated circuit) and by creating a boundary or a bounding box enclosing the plurality of identified physical circuit component designs. The boundary or bounding box may be created to be the minimum rectilinear or rectangular box enclosing the plurality of device designs in some embodiments. In some other embodiments, the boundary or bounding box may be created to be the minimum bounding box of the plurality of layout circuit component designs plus an offset to enclose the plurality of physical circuit component designs. More details about figure groups are described in U.S. patent application Ser. No. 15/282,739 entitled "METHODS, SYSTEMS, AND COMPUTER PROGRAM PRODUCT FOR IMPLEMENTING ENGINEERING CHANGE ORDERS WITH FIGURE GROUPS AND VIRTUAL HIERARCHIES" and U.S. patent application Ser. No. 15/282,778 entitled "METHODS, SYSTEMS, AND COMPUTER PROGRAM PRODUCT FOR IMPLEMENTING SYNCHRONOUS CLONES FOR AN ELECTRONIC DESIGN", the entire contents of which are hereby expressly incorporated by reference in their entireties for all purposes.

A schematic design corresponding to the layout or the portion thereof may be identified at 306. In addition, the schematic circuit component designs corresponding to the plurality of figure groups may also be identified at 306. In some embodiments, the layout is created and bound the corresponding schematic design such that every schematic circuit component design is correlated to a corresponding layout circuit component design. This binding information between the layout and the corresponding schematic design may be stored in a data structure. For example, information about each schematic circuit component design (e.g., a schematic instance) may be stored in a row in a database together with information (e.g., identifiers) about, for example, their corresponding schematic parent instances or masters, their corresponding layout circuit components, etc. stored in different columns.

If a schematic circuit component design is also associated with one or more hierarchical parameters, the information about these one or more hierarchical parameters, their corresponding values, etc. may also be stored in one or more columns in the database. Connectivity information for a schematic circuit component design and the corresponding connectivity (e.g., identifiers of pins, ports, terminals, nets, etc.) information for the corresponding layout circuit component design may also be stored in multiple columns in the database.

A display stop level parameter may be identified at 308, and its value may be identified at 310. A decision may then be made at 312 to determine whether the display stop level value is zero ("0"). In these embodiments, the display stop level values include numeric values for the ease of explanation and description although it shall be noted that the display stop level parameter may include values of different formats as described above with reference to 206 of FIG. 2.

In these embodiments, a display stop level value of zero corresponds to the highest virtual hierarchy; a display stop level value of one ("1") corresponds to the first lower virtual hierarchy situated immediately below highest virtual hierarchy; a display stop level value of two ("2") corresponds to the second lower virtual hierarchy situated immediately below the first lower virtual hierarchy; and each successively numeric value corresponds to the next lower virtual hierarchy.

If the determination result at 312 is affirmative, the display stop level value indicates that only the layout circuit component designs at the highest virtual hierarchy are to be displayed in the layout window. Consequently, the plurality of figure groups identified or generated at 304 are abstracted by suppressing or hiding the design details within each of the plurality of figure groups in the layout at 314. The corresponding schematic design may also be optionally updated at 316 to display the schematic design view to show the schematic circuit component designs at the top schematic hierarchy.

If the determination result at 312 is negative, the virtual hierarchy may be identified from the one or more virtual hierarchies at 318 according to the display stop level value identified at 310. The layout circuit component designs at this virtual hierarchy may be displayed at 320 for the plurality of figure groups in the layout. In some of these embodiments, the layout circuit component designs at this virtual hierarchy and the layout circuit component designs at all the virtual hierarchies above this virtual hierarchies may also be displayed in the layout at 320. For example, if the virtual hierarchy is determined to be the second lower virtual hierarchy that is immediately below the first lower virtual hierarchy which is immediately below the top virtual hierarchy, the layout circuit component designs at the second lower virtual hierarchy, the first lower virtual hierarchy, and the top virtual hierarchy are displayed in the layout in these embodiments.

A schematic hierarchy corresponding to the display stop level value or to the identified virtual hierarchy may be optionally identified at 322. The schematic circuit component designs at this schematic hierarchy and optionally the schematic circuit component circuit component designs at any schematic levels above this identified schematic hierarchy may be identified and displayed in the schematic view at 324. In this manner, these techniques enable the layout view and the schematic view to become in sync so that they can be cross referenced with each other.

The schematic view associated with the display stop level value may be optionally cached in a dynamic memory or stored in a persistent storage device at 326 for subsequent retrieval and reuse so that the cached or stored schematic view may be subsequently reused without consuming computational resources to compose the schematic view. Similarly, the layout view associated with the display stop level value may also be optionally cached in a dynamic memory or stored in a persistent storage device at 328 for subsequent retrieval and reuse so that the cached or stored layout view may also be subsequently reused without consuming computational resources to compose the layout view.

Figure 4A:
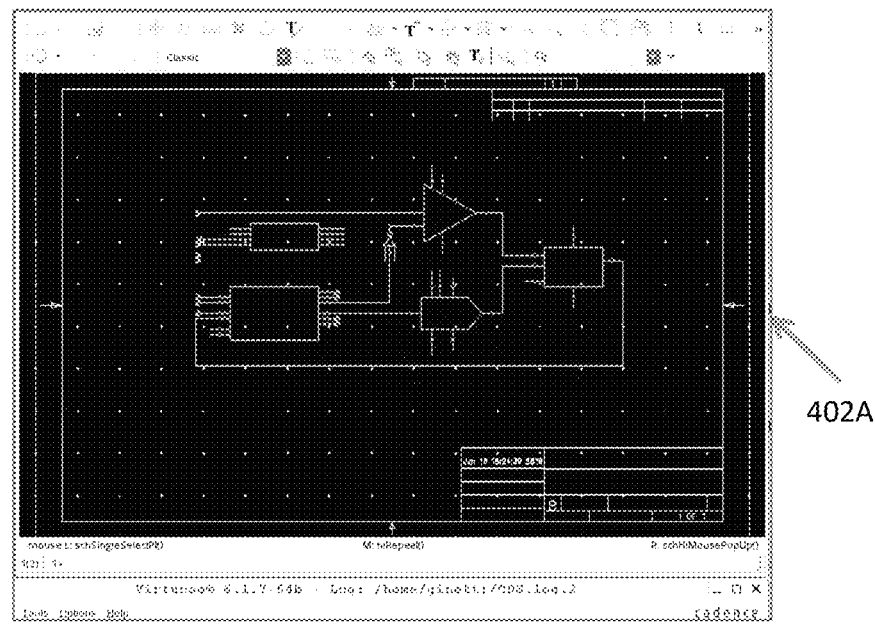
FIGS. 4A-4F illustrate some examples of the application of some techniques for dynamically abstracting virtual hierarchies for an electronic design described herein to simplified portions of electronic designs in some embodiments.
Figure 4A:
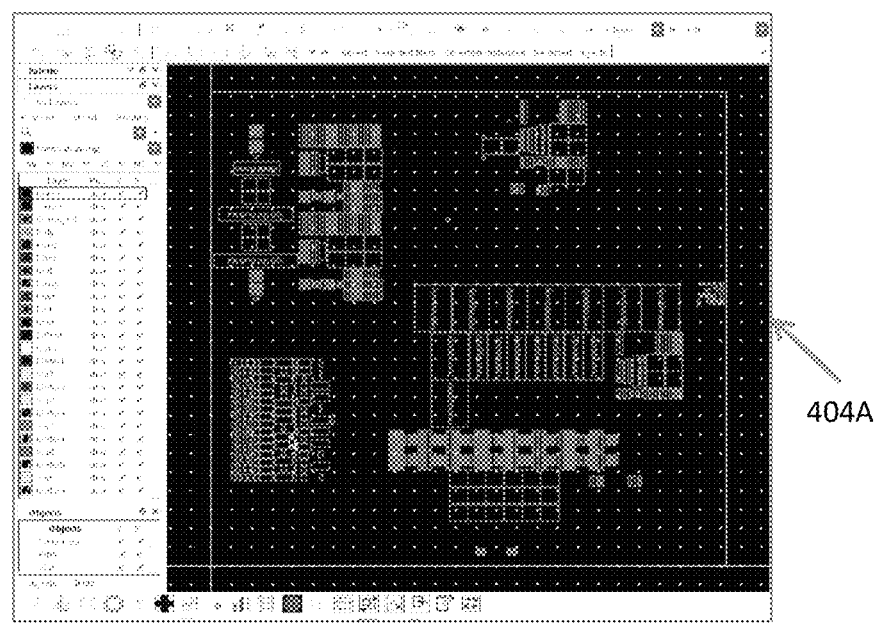
Figure 4B:
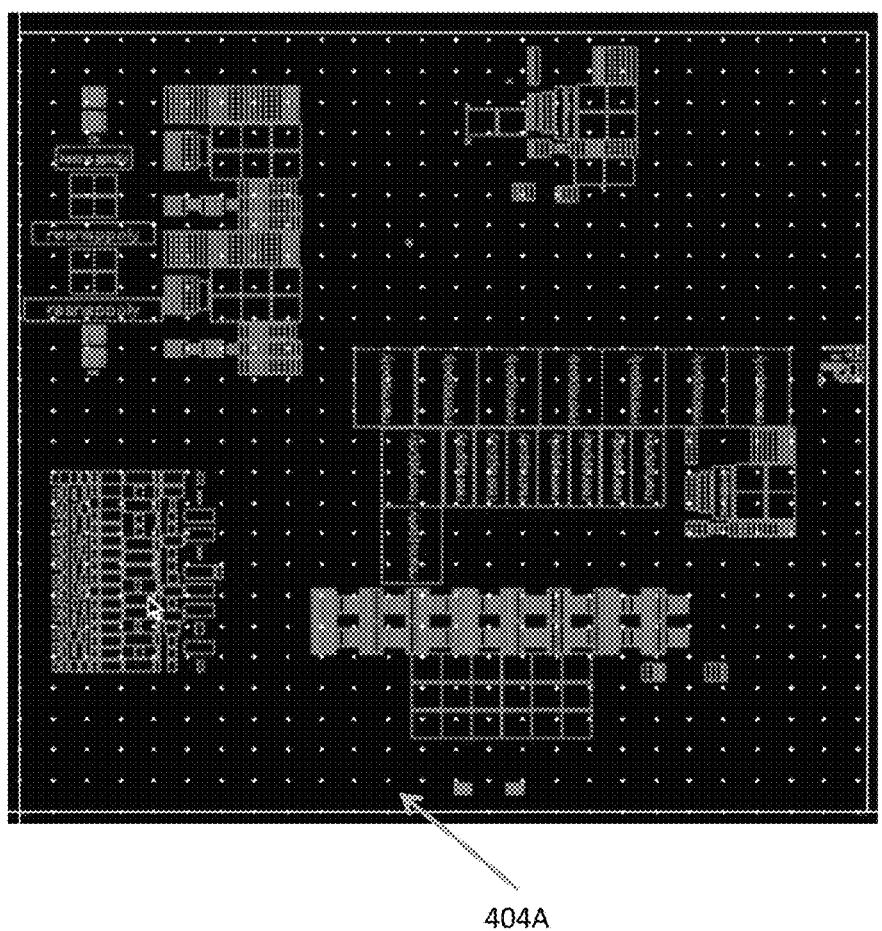
Figure 4C:
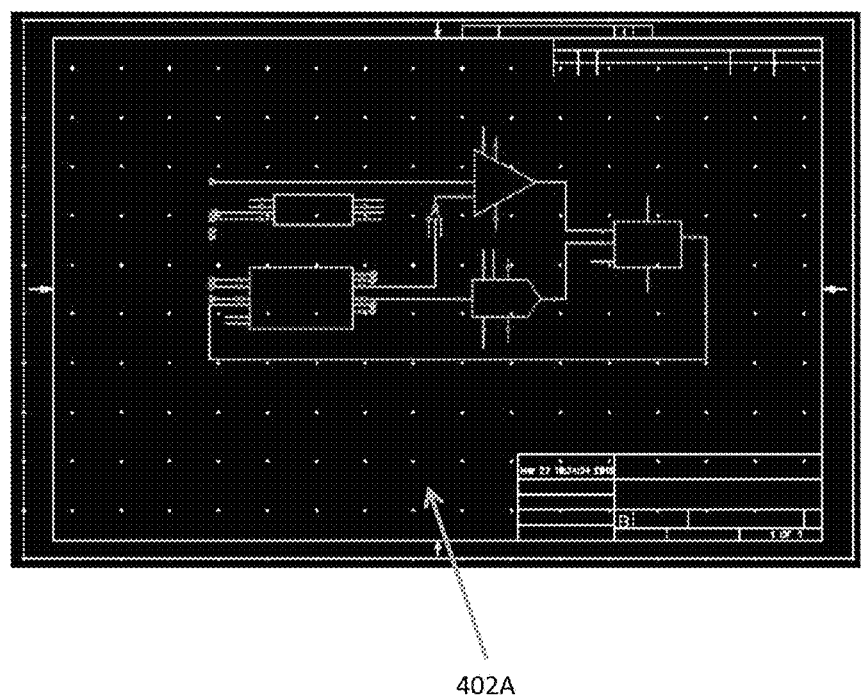

FIGS. 4A-4F illustrate some examples of the application of some techniques for dynamically abstracting virtual hierarchies for an electronic design described herein to simplified portions of electronic designs in some embodiments. FIG. 4A illustrates a portion of a layout 404A in a layout window of a layout tool and its corresponding schematic design 402A in a schematic window of a schematic tool. FIG. 4B illustrates the portion of the layout 404A; and FIG. 4C illustrates the schematic design 402A, without the user interface elements.

Figure 4D:
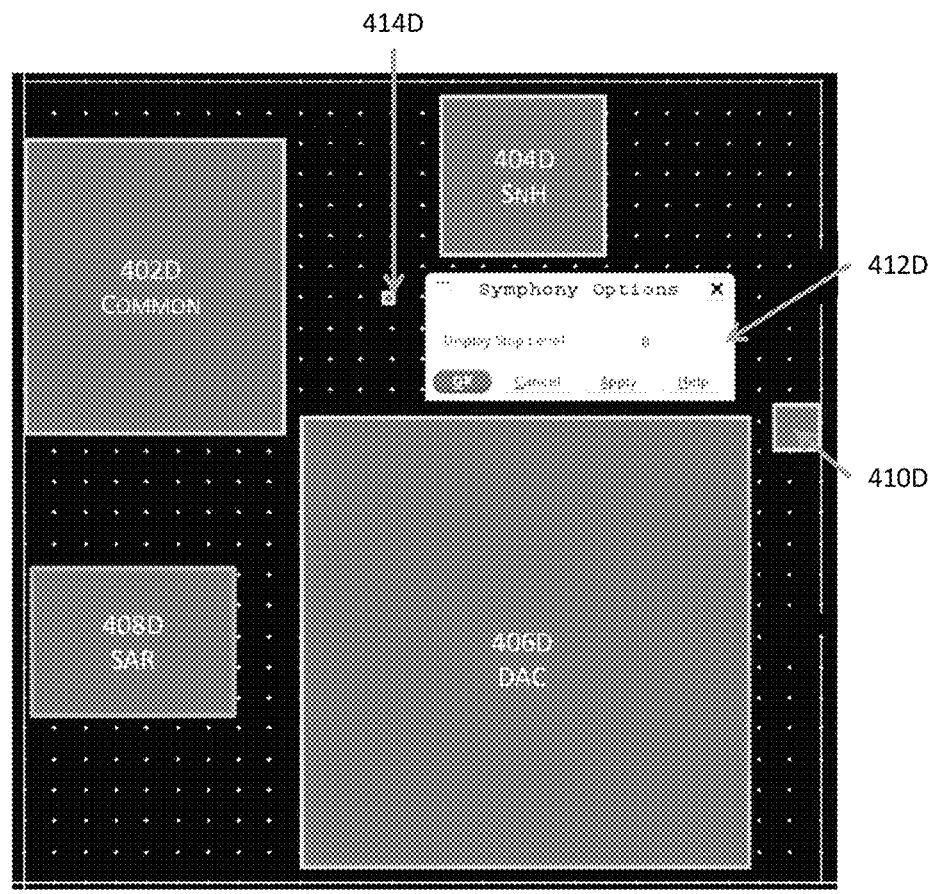

FIG. 4D illustrates that the dynamic abstraction module abstracts the layout portion 404A according to a display stop level value of zero ("0") in a display stop level configuration window 412D indicating that only the layout circuit component designs in the top virtual hierarchy are to be displayed in the layout portion. As FIG. 4D shows, the top virtual hierarchy includes five figure groups, 402D, 404D, 406D, 408D, and 410D, as well as a discrete circuit component design 414D. With the display stop level set to the value of zero, the internal layout details in these five figure groups are suppressed or hidden, and these five figure groups are abstracted as the respective abstract representations of rectangles representing, for example, the respective bounding boxes of these five figure groups.

Figure 4E:
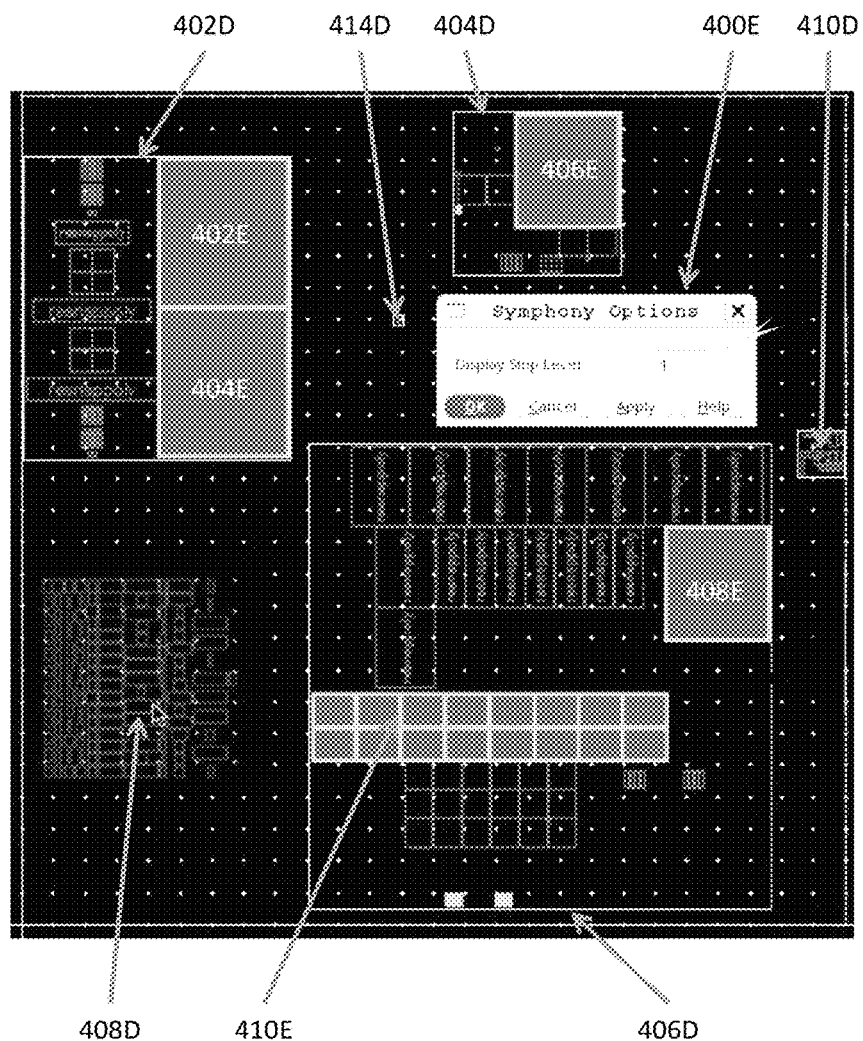

FIG. 4E illustrates that the dynamic abstraction module abstracts the layout portion 404A according to a display stop level value of one ("1") in a display stop level configuration window 400E indicating that only the layout circuit component designs in the top virtual hierarchy as well as the first lower virtual hierarchy immediately below the top virtual hierarchy are to be displayed in the layout portion.

In response to this display stop level value of one, the dynamic abstraction module, either alone or in tandem the layout editor, identifies the layout circuit component designs belonging to the first lower hierarchy immediately below the top virtual hierarchy as well as the layout circuit component designs at the top virtual hierarchy for display. In addition, the dynamic abstraction module suppresses or hides the layout details that belong to any successive virtual hierarchies below the first lower virtual hierarchy. As a result, some layout circuit component designs belonging to the first lower virtual hierarchy in the five figure groups (402D, 404D, 406D, 408D, and 410D) are thus shown in the layout portion.

Nonetheless, layout circuit component designs belonging to virtual hierarchies lower than the first virtual hierarchy are still abstracted. For example, figure group 402D includes two figure groups 402E and 404E that are located at a lower virtual hierarchy (e.g., the second lower virtual hierarchy) below the first virtual hierarchy. Therefore, the dynamic abstraction module abstracts these two figure groups 402E and 404E and represents them as rectangles (e.g., bounding boxes) as shown in FIG. 4E. Similarly, figure group 406E in figure group 404D as well as figure groups 408E and 410E in figure group 406D also belong to a virtual hierarchy below the first virtual hierarchy and are thus similarly abstracted as figure groups 402E and 404E in figure group 402D. All the layout circuit component designs in figure group 408D are located at the first lower virtual hierarchy and are thus displayed in response to the display stop level value of one.

Figure 4F:
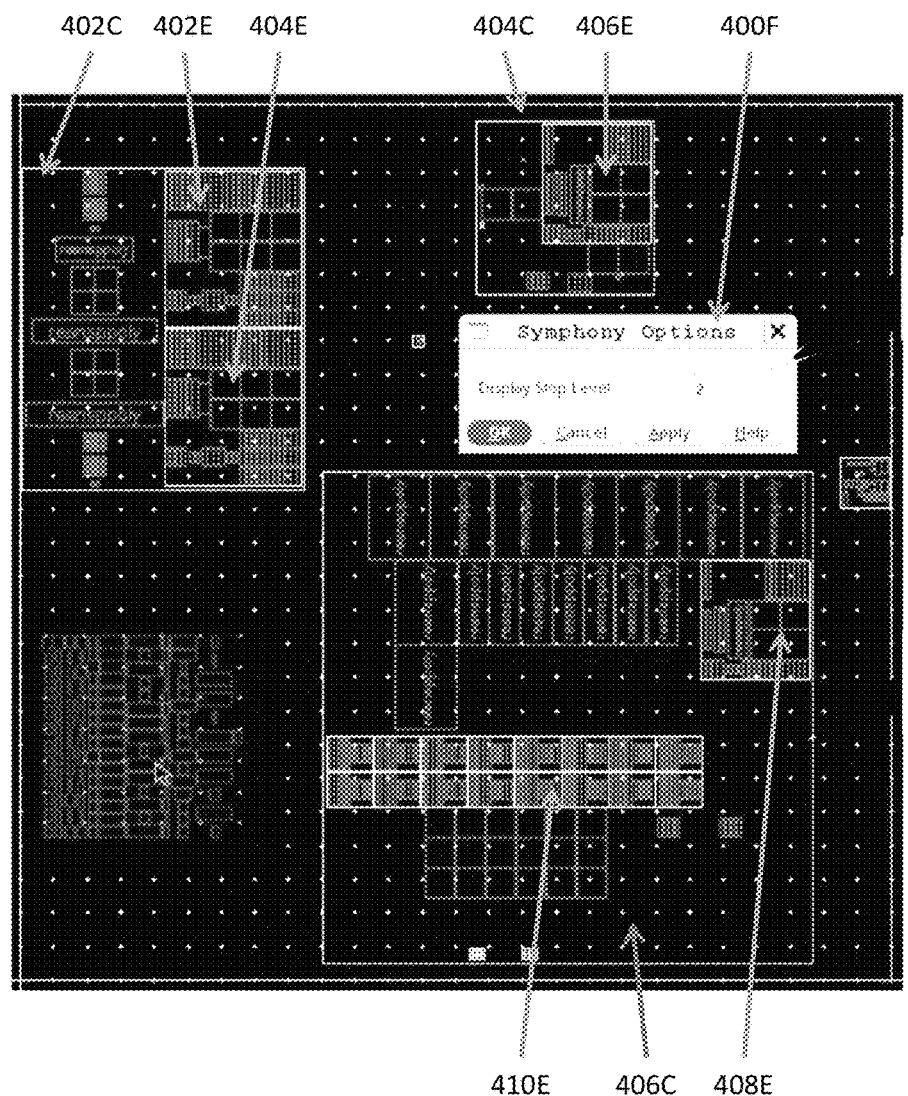

FIG. 4F illustrates that the dynamic abstraction module abstracts the layout portion 404A according to a display stop level value of two ("2") in a display stop level configuration window 400F indicating that the layout circuit component designs in the top three virtual hierarchies (the top virtual hierarchy, the first virtual hierarchy immediately below the top virtual hierarchy, and the second virtual hierarchy immediately below the first lower virtual hierarchy) are to be displayed in the layout portion.

Assuming all the layout circuit component designs in figure groups 402E and 404E in figure group 402C, figure group 406E in figure group 404C, and figure groups 408E and 410E in figure group 406C are all located at the second lower virtual hierarchy. As a result, the dynamic abstraction module identifies all the layout circuit component designs in these figure groups together with the other layout circuit component designs and display them in the layout portion as shown in FIG. 4F.

Figure 5:
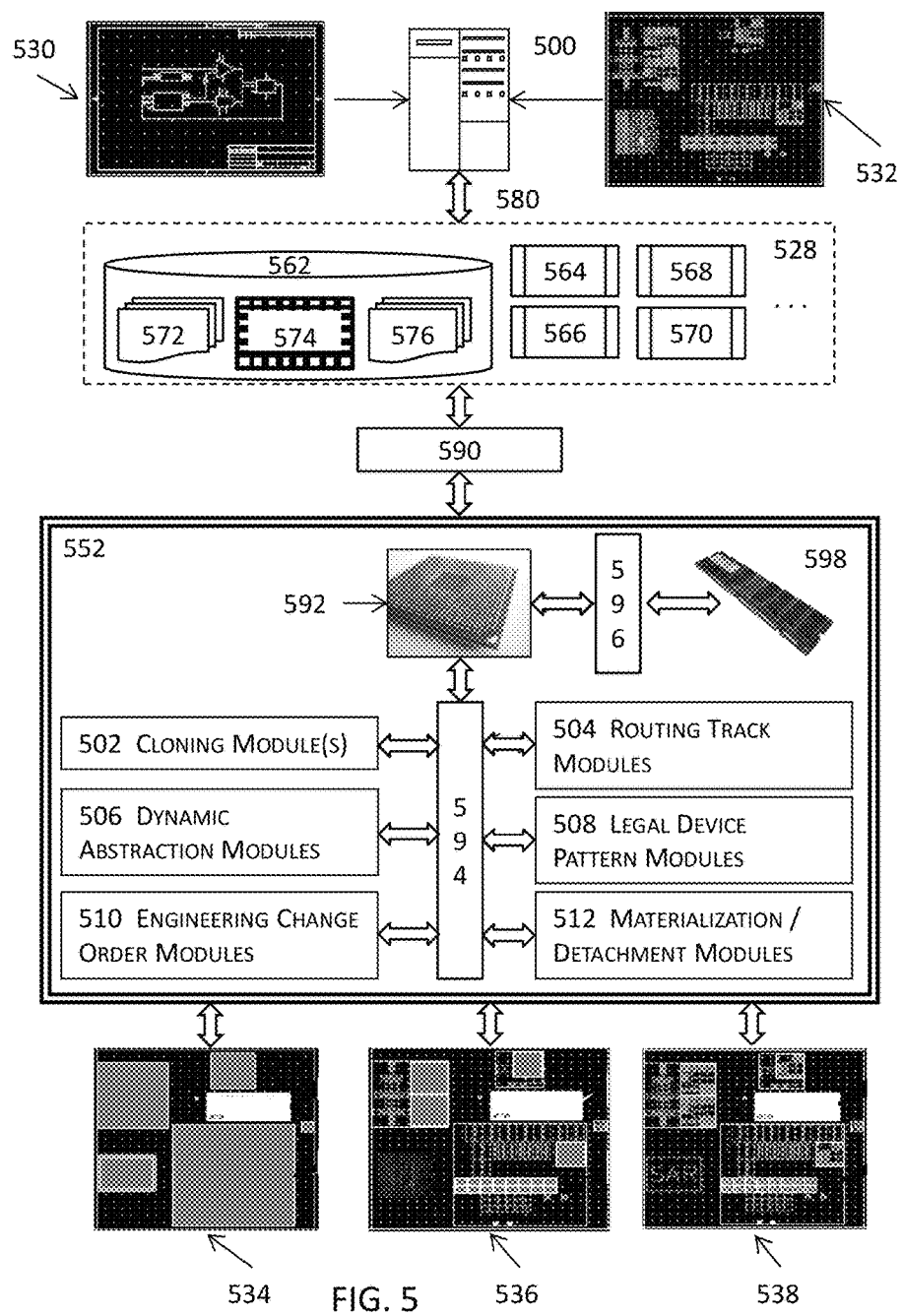
FIG. 5 illustrates another high level block diagram of a simplified system for dynamically abstracting virtual hierarchies for an electronic design in one or more embodiments.

FIG. 5 illustrates another high level block diagram of a simplified system for dynamically abstracting virtual hierarchies for an electronic design in one or more embodiments. In these one or more embodiments, the hardware system in FIG. 5 may comprise one or more computing systems 500, such as one or more general purpose computers described in the System Architecture Overview section to implement one or more special proposes. The illustrative system in FIG. 5 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 5 may be located in a cloud computing platform in some embodiments.

In some embodiments, the one or more computing systems 500 may invoke various system resources such as the processor(s) or processor core(s), memory, disks, etc. and receive a layout 530 including a figure group having a plurality of layout devices. The one or more computing systems 500 receive a layout 532 including a plurality of virtual hierarchies and optionally the corresponding schematic 530 that is bound to the layout 532. The one or more computing systems 500 may identify the appropriate virtual hierarchy in response to a first display stop level value, identify layout circuit component designs based on the identified virtual hierarchy, and display these identified layout circuit component designs as shown in the abstracted layout 534. Different display stop level values may result in different abstracted layouts 536 and 538 each providing different levels of details and different levels of abstractions in the layout window of the user interface.

For layout details that are located at one or more virtual hierarchies below the currently identified virtual hierarchy, these layout details will be represented as abstractions in the layout window. For example, if the current display stop level value is to display layout details up to the virtual hierarchy at which a cell is located, any sub-cells in the cell may be represented as abstractions such as polygonal shapes containing no internal details. In some embodiments, these abstractions may include interface elements (e.g., pins, ports, terminals, etc.) but not internal layout circuit component designs.

The one or more computing systems 500 may further write to and read from a local or remote non-transitory computer accessible storage 562 that stores thereupon data or information such as, but not limited to, one or more databases (574) such as schematic design database(s) or physical design database(s), electronic circuit design specification database(s), various statistics, various data, rule decks, various design rules, constraints, etc. (572), or other information or data (576) that may be used to facilitate the performance of various functions to achieve the intended purposes.

The one or more databases 574 may further include a plurality of cells, blocks, or modules (collectively a cell for singular and cells for plural). Cells may include, for example, one or more standard cells, one or more library cells, one or more memory cells, one or more macro cells, or any combinations thereof. A cell may be an object of a class in the paradigm of object oriented programming and may thus be instantiated into multiple instances to create at least a portion of a hierarchical physical design (e.g., a floorplan, a layout, etc.) or to create a larger and/or more complex cell in some embodiments. In the real hierarchy structure of a hierarchical physical design, certain cells may be situated at the lowest hierarchical level and do not contain any lower hierarchies.

In some embodiments, the one or more computing systems 500 may include or, either directly or indirectly through the various resources 528, invoke a set of mechanisms or modules 552 including hardware and software modules or combinations of one or more hardware and one or more software modules that are stored at least partially in computer memory may comprises one or more cloning modules 502 to identify and/or create clones.

A cloning module 502 may by itself or in tandem with one or more other modules identify or create clones in the layout 532 that may be optionally materialized into a physical block or cell 534. The one or more computing systems 500 may also initiate or interact with other computing systems to access, via a computer bus architecture (e.g., a system bus, a control bus, a data bus, or any combinations thereof), various resources 528 that may comprise a floorplanner, a placement module, a global routing module, and/or a detail routing module 564, a layout editor 566, a design rule checker 568, a verification engine 570, etc.

The set of modules 552 may further include one or more routing track modules 504 to manage and determine routing tracks that may be inherited by various figure groups at one or more virtual hierarchies without causing any violations of rules for routing track assignments, routing track coloring, etc. The set of modules 552 may further optionally include one or more dynamic abstraction modules 506 to identify the appropriate virtual hierarchy in response to a display stop level value, identify the pertinent layout component designs for display, display the identify pertinent layout component designs, and abstract design details belonging to one or more lower virtual hierarchies below the identified virtual hierarchy.

In addition or in the alternative, the set of modules 552 may further include one or more legal device pattern modules 508 to identify and/or create legal device patterns into one or more figure groups so that all the pertinent rules or requirements will be automatically complied with so long as the arrangements in these legal device patters are observed. In some embodiments, the set of modules 552 may further include one or more engineering change order (ECO) modules 510 to function in tandem with figure groups and virtual hierarchies to implement engineering change orders.

The set of modules 552 may also include a detachment or materialization module 512 to materialize a figure group into a physical block and to materialize a virtual hierarchy into a physical hierarchy and update the physical hierarchical structure of a layout accordingly. Any of these modules described may be stored at least partially in memory and include or function in tandem with one or more microprocessors or one or more processor cores to perform respective functions described herein. The set of modules 552 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC (integrated circuits) fabrication facility that in turn fabricates the requisite photomasks and the eventual electronic circuit.

In some embodiments, the computing system 500 may include the various resources 528 such that these various resources may be invoked from within the computing system via a computer bus 580 (e.g., a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. These one or more modules in the set 552 may include or at least function in tandem with a microprocessor 592 via a computer bus 594 in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

Various techniques described herein abstract a layout having a plurality of virtual hierarchies into an abstracted representation (or abstraction) according to a display stop level setting. A virtual hierarchy is not a physical hierarchy. Rather, a virtual hierarchy may include a transient hierarchical level that is created for the manipulation of the layout or a portion thereof. Therefore, a virtual hierarchy doses not disturb or change the physical hierarchy in the schematic or the generated layout. A virtual hierarchy may be automatically created when an instance of a cell is going to be created from the corresponding schematic cell.

As the examples illustrated in FIGS. 4A-4F show, a schematic design may include a schematic instance of a DAC (digital-analog converter) which may further include a plurality of circuit component designs. When creating the layout components for the DAC, these techniques place the plurality of circuit component layout designs in the layout canvas having a single hierarchy (e.g., a flat design) and create a virtual hierarchy for the plurality of circuit component designs. This virtual hierarchy may be decorated, annotated, or associated with the corresponding schematic hierarchy or schematic instance for EDA tools to become aware of where this virtual hierarchy is located and corresponds to in the schematic or physical hierarchy. For example, the virtual hierarchy may be decorated with the identification of the schematic instance or the identification of the master cell from which the schematic instance corresponding to the plurality of layout circuit component designs is instantiated.

In some embodiments, a physical implementation tool (e.g., a design planning tool or a floorplanner) may create a layout (e.g., a floorplan, a placement layout, a post-route layout, etc.) by inserting each schematic circuit component design into a flat layout and generate virtual hierarchies according to the schematic hierarchy as the schematic circuit component designs are inserted into the floorplan. From the physical design perspective, the layout (e.g., floorplan) includes one hierarchy—a flat layout—at the completion of the generation of the layout although the flat layout may also correspond to a plurality of virtual hierarchies that correspond to the schematic hierarchies of the corresponding schematic design.

These techniques described herein abstract a layout into an abstraction and thus enable designers to view only the layout circuit component designs at one or more virtual hierarchies of interest by setting the display stop level parameter. These techniques may also abstract the schematic design accordingly to synchronize the abstracted layout with the abstracted schematic design. Any abstracted views (e.g., abstracted layout views, abstracted schematic views, etc.) may be cached or stored for subsequent reuse, without recomposing these abstracted views.

System Architecture Overview

Figure 6:
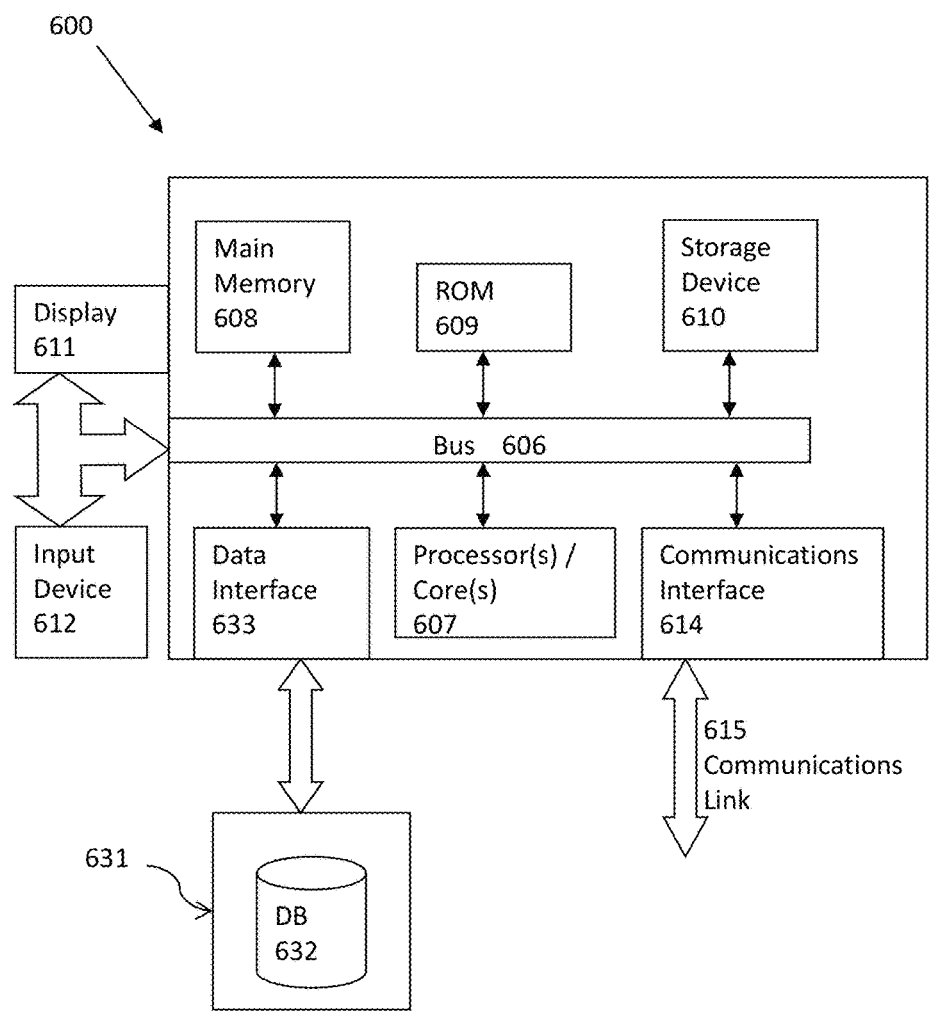
FIG. 6 illustrates a computerized system on which a method for dynamically abstracting virtual hierarchies for an electronic design may be implemented.

FIG. 6 illustrates a computerized system on which a method for dynamically abstracting virtual hierarchies for an electronic design may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown). The illustrative computing system 600 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 600 may include or may be a part of a cloud computing platform in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for dynamically abstracting virtual hierarchies for an electronic design, comprising:

executing, at a dynamic abstraction module coupled to a micro-processor of a computing system, a sequence of instructions to perform a process, the process comprising:

identifying at least a layout portion of a layout of an electronic design;

determining a virtual hierarchy in at least the layout portion according to a value that is received at a user interface for a display stop level;

selecting, based at least in part upon an input received at the user interface via an input device of the computing system, a plurality of layout circuit component designs according to the virtual hierarchy; and in response to the input and the value for the display stop level identified at the user interface, generating an abstracted layout portion comprising the plurality of layout circuit components from at least the layout portion at least by displaying a representation corresponding to the plurality of layout circuit component designs and further by suppressing one or more remaining layout circuit component designs located at or below a hierarchical level corresponding to the display stop level from displaying in the user interface.

2. The computer implemented method of claim 1, the process further comprising:

updating a schematic design portion corresponding to at least the layout portion according to the display stop level value.

3. The computer implemented method of claim 2, the process further comprising:

determining a schematic hierarchy in a schematic design based in part or in whole upon the display stop level value or upon the virtual hierarchy by using binding information between the schematic design and the layout of the electronic design; and identifying a plurality of schematic circuit component designs that are located at or above the schematic hierarchy.

4. The computer implemented method of claim 3, the process further comprising:

abstracting the schematic design at least by displaying the plurality of schematic circuit component designs and by suppressing one or more schematic circuit component designs at one or more schematic hierarchies below the schematic hierarchy.

5. The computer implemented method of claim 1, the process further comprising:

identifying a plurality of figure groups at one or more virtual hierarchies in at least the layout portion; and identifying a schematic design portion corresponding to at least the layout portion based in part or in whole upon binding information between at least the layout portion and the schematic design portion.

6. The computer implemented method of claim 5, wherein the binding information includes mapping information between the one or more virtual hierarchies in at least the layout portion and one or more respective schematic hierarchies in the schematic design portion.

7. The computer implemented method of claim 5, the process further comprising:

determining whether the display stop level value corresponds to a top virtual hierarchy that is located below no other virtual hierarchies in at least the layout portion; and abstracting at least the layout portion at least by suppressing layout circuit component designs within the one or more figure groups and by representing the one or more figure groups in one or more corresponding abstractions in at least the layout portion when the display stop level value is determined to correspond to the top virtual hierarchy.

8. The computer implemented method of claim 7, wherein an abstraction includes a rectilinear geometric shape that includes no layout circuit component designs within a boundary of the rectilinear geometric shape.

9. The computer implemented method of claim 7, the process further comprising:

identifying one or more higher virtual hierarchies that are located above the virtual hierarchy in a virtual hierarchical structure when the display stop level value is determined not to correspond to a top virtual hierarchy.

10. The computer implemented method of claim 9, the process further comprising:

identifying one or more additional layout circuit component designs located at the one or more higher virtual hierarchies in the plurality of figure groups; and abstracting at least the layout portion into an abstracted layout portion at least by displaying the one or more additional layout circuit component designs located at the one or more higher virtual hierarchies in at least the layout portion.

11. The computer implemented method of claim 10, the process further comprising:

identifying one or more other layout circuit component designs that are not located at the one or more higher virtual hierarchies or the virtual hierarchy in the plurality of figure groups; and updating at least the layout portion into the abstracted layout portion by abstracting the one or more other layout circuit component designs.

12. The computer implemented method of claim 1, the process further comprising:

storing an abstracted layout view for the abstracted layout portion or an abstracted schematic view of a corresponding schematic design in a cache, a non-transitory, non-persistent computer readable storage medium, or a transitory, non-persistent computer readable storage medium; and reusing the abstracted layout view or the abstracted schematic view by retrieving the abstracted layout view or the abstracted schematic view from the cache, the non-transitory, non-persistent computer readable storage medium, or the transitory, non-persistent computer readable storage medium without recomposing the abstracted layout view or the abstracted schematic view.

13. A system for dynamically abstracting virtual hierarchies for an electronic design, comprising:
- non-transitory computer accessible storage medium storing thereupon program code;
- an dynamic abstraction module that is stored at least partially in memory of one or more computing systems, include or function in conjunction with at least one micro-processor of the one or more computing systems, and are configured to execute the program code to identify at least a portion of a layout of an electronic design;
- the dynamic abstraction module further configured to execute the program code to determine a virtual hierarchy in the at least the portion according to a value that is received at a user interface for a display stop level;
- the dynamic abstraction module further executing the program code to select, based at least in part upon an input received at the user interface via an input device of the computing system, a plurality of layout circuit component designs according to the virtual hierarchy; and
- in response to the input and the value for the display stop level identified at the user interface, generating an abstracted layout portion comprising the plurality of layout circuit components from at least the layout portion, the dynamic abstraction module further executing the program code to display a representation corresponding to the plurality of layout circuit component designs and further by suppressing one or more remaining layout circuit component designs located at or below a hierarchical level corresponding to the display stop level from displaying in the user interface.

14. The system for claim 13, the dynamic abstraction module further executing the program code to:
- update a schematic design portion corresponding to at least the layout portion according to the display stop level value; and
- determine a schematic hierarchy in a schematic design based in part or in whole upon the display stop level value or upon the virtual hierarchy by using binding information between the schematic design and the layout of the electronic design.

15. The system for claim 14, the dynamic abstraction module further executing the program code to:
- identify a plurality of schematic circuit component designs that are located at or above the schematic hierarchy; and
- abstract the schematic design at least by displaying the plurality of schematic circuit component designs and by suppressing one or more schematic circuit component designs at one or more schematic hierarchies below the schematic hierarchy.

16. The system for claim 13, the dynamic abstraction module further executing the program code to:
- identify a plurality of figure groups at one or more virtual hierarchies in at least the layout portion;
- identify a schematic design portion corresponding to at least the layout portion based in part or in whole upon binding information between at least the layout portion and the schematic design portion, wherein the binding information includes mapping information between the one or more virtual hierarchies in at least the layout portion and one or more respective schematic hierarchies in the schematic design portion;
- determine whether the display stop level value corresponds to a top virtual hierarchy that is located below no other virtual hierarchies in at least the layout portion; and
- abstract at least the layout portion at least by suppressing layout circuit component designs within the one or more figure groups and by representing the one or more figure groups in one or more corresponding abstractions in at least the layout portion when the display stop level value is determined to correspond to the top virtual hierarchy.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for dynamically abstracting virtual hierarchies for an electronic design, the set of acts comprising:
- executing, at a dynamic abstraction module coupled to a micro-processor of a computing system, a sequence of instructions to perform a process, the process comprising:
- identifying at least a portion of a layout of an electronic design;
- determining a virtual hierarchy in the at least the portion according to a value that is received at a user interface for a display stop level;
- selecting, based at least in part upon an input received at the user interface via an input device of the computing system, a plurality of layout circuit component designs according to the virtual hierarchy; and
- in response to the input and the value for the display stop level identified at the user interface, generating an abstracted layout portion comprising the plurality of layout circuit components from at least the layout portion at least by displaying a representation corresponding to the plurality of layout circuit component designs and further by suppressing one or more remaining layout circuit component designs located at or below a hierarchical level corresponding to the display stop level from displaying in the user interface.

18. The article of manufacture of claim 17, the set of acts further comprising:
- identifying a plurality of figure groups at one or more virtual hierarchies in at least the layout portion;
- identifying a schematic design portion corresponding to at least the layout portion based in part or in whole upon binding information between at least the layout portion and the schematic design portion;
- determining whether the display stop level value corresponds to a top virtual hierarchy that is located below no other virtual hierarchies in at least the layout portion; and
- abstracting at least the layout portion at least by suppressing layout circuit component designs within the one or more figure groups and by representing the one or more figure groups in one or more corresponding abstractions in at least the layout portion when the display stop level value is determined to correspond to the top virtual hierarchy.

19. The article of manufacture of claim 18, the set of acts further comprising:
- identifying one or more higher virtual hierarchies that are located above the virtual hierarchy in a virtual hierarchical structure when the display stop level value is determined not to correspond to a top virtual hierarchy;

identifying one or more additional layout circuit component designs located at the one or more higher virtual hierarchies in the plurality of figure groups; and abstracting at least the layout portion into an abstracted layout portion at least by displaying the one or more additional layout circuit component designs located at the one or more higher virtual hierarchies in at least the layout portion.

20. The article of manufacture of claim 19, the set of acts further comprising:

identifying one or more other layout circuit component designs that are not located at the one or more higher virtual hierarchies or the virtual hierarchy in the plurality of figure groups;

updating at least the layout portion into an abstracted layout portion by abstracting the one or more other layout circuit component designs;

storing an abstracted layout view for the abstracted layout portion or an abstracted schematic view of a corresponding schematic design in a cache, a non-transitory, non-persistent computer readable storage medium, or a transitory, non-persistent computer readable storage medium; and reusing the abstracted layout view or the abstracted schematic view by retrieving the abstracted layout view or the abstracted schematic view from the cache, the non-transitory, non-persistent computer readable storage medium, or the transitory, non-persistent computer readable storage medium without recomposing the abstracted layout view or the abstracted schematic view.

* * * * *